United States Patent [19]

Kokubo et al.

[11] 3,765,932
[45] Oct. 16, 1973

[54] METHOD FOR ANTI-CORROSIVE COATING

[75] Inventors: Takamasa Kokubo; Isao Shimokuma, both of Kobe; Haruji Takahashi, Akashi; Katsuhiko Hirano, Kobe; Masahiro Segawa, Iwaki, all of Japan

[73] Assignees: Shinko-Pfaudler Company Limited, Hyogo-ken; Kureha Kagaku Kogyo Kabushiki Kaisha, Tokyo, Japan; a part interest to each

[22] Filed: Mar. 24, 1972

[21] Appl. No.: 237,968

Related U.S. Application Data

[62] Division of Ser. No. 96,245, Dec. 8, 1970, abandoned.

[30] Foreign Application Priority Data

Dec. 10, 1969 Japan.............................. 44/99239

[52] U.S. Cl. ...... 117/132 CF, 117/21, 117/161 UF, 260/900, 260/31.8 F
[51] Int. Cl......................... B32b 15/08, B44d 1/36
[58] Field of Search................ 117/132 CF, 161 UF; 260/900, 31.8 F; 106/14

[56] References Cited

UNITED STATES PATENTS

| | | | |
|---|---|---|---|
| 3,005,795 | 10/1961 | Busse et al.......................... | 260/900 |
| 3,380,983 | 4/1968 | Siegart et al..................... | 117/132 X |
| 2,888,364 | 5/1959 | Bauer.............................. | 117/132 X |
| 3,169,120 | 2/1965 | Capron et al................... | 117/132 X |
| 3,442,853 | 5/1969 | Gobstein........................ | 117/132 X |
| 3,449,466 | 6/1969 | Gerek et al..................... | 117/132 X |
| 3,579,610 | 5/1971 | Petropoulos et al............ | 117/132 X |
| 2,793,202 | 5/1957 | Hoyt................................ | 106/14 X |
| 3,294,871 | 12/1966 | Schmitt et al................... | 260/900 |
| 3,579,370 | 5/1971 | Punderson et al.............. | 117/161 X |
| 3,287,288 | 11/1966 | Reiling............................. | 260/900 |

Primary Examiner—William D. Martin
Assistant Examiner—Harry J. Gwinnell
Attorney—E. F. Wenderoth et al.

[57] ABSTRACT

Anti-corrosion coating method, wherein a composition prepared by mixing a vinylidene fluoride resin and a tetrafluoroethylene resin at an appropriate mixing proportion and a mixture of low and high boiling point solvents is used as the coating material.

4 Claims, No Drawings

METHOD FOR ANTI-CORROSIVE COATING

This is a division of application Ser. No. 96,245, filed Dec. 8, 1970, now abandoned.

This invention relates to a method for anti-corrosion coating and a composition to be used for such coating. More particularly, it is concerned with an anti-corrosion coating utilizing a composition prepared by mixing a vinylidene fluoride resin and a tetrafluorethylene resin.

As is well known, vinylidene fluoride resins are a class of fluorine resins representable by the structural formula

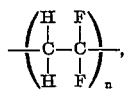

and are thermoplastic. Owing to the alternate presence of hydrogen and fluorine atoms in the molecular chain, the resins possess many different properties which do not exist in conventional synthetic resins as well as in related fluorine resins. In particular, vinylidene fluoride resins are excellent in mechanical properties such as tensile strength, impact-resistance, wear-resistance, etc. They are also superior in chemical-resistance, and, in addition, have good thermal stability, and hence remarkable melt-workability, which no other fluorine resins possess. On account of such eminent properties, vinylidene fluoride resins have recently been noticed as materials for anti-corrosive linings and protective coatings for various apparatus and appliances in chemical industries.

As to corrosion-resistant properties, the resins well withstand most inorganic acids, alkalis, strong oxidizing agents, and halogens, with the exception that the resins are corroded by fuming sulfuric acid at a normal temperature, and by fuming nitric acid and concentrated sulfuric acid at a high temperature.

Also, the vinylidene fluoride resins exhibit almost perfect durability against organic solvents of aliphatic hydrocarbons, aromatic hydrocarbons, alcohols, organic acids, and so on, with the exception that they are affected by solvents of strong polarity such as n-butyl amine, dimethylacetoamide, acetone, etc.. This durability against organic solvents surpasses that of ordinary anti-corrosive synthetic resins such as polyethylene, polypropylene, polyvinyl chloride, phenolic resin, epoxy resin, furan resin, etc..

Thus, vinylidene fluoride resins exhibit excellent anti-corrosion properties against various sorts of chemicals over wide ranges of concentrations and temperature. However, when the vinylidene fluoride resin is used singly as a lining or protective coating for various apparatus, it causes fatal defects in the resultant lining or coating. The reason for this is as follows: (1) since vinylidene fluoride causes relatively large volume contraction, when it is cooled to solidify from its molten state, if a base metal to be coated has on its surface any concaved portion of small radius of curvature, a number of vacuum foams are created during the coating process at the concaved portion, or the coated film peels off the base metal to cause a vacuum gap at the interface between the coating and the metal; (2) even if the coating itself is not corroded or swelled by solvent, when water penetrates the coating to wet the metal at the interface between the coating and the metal, the coated film is blistered by water to lower its adherence to the base metal with the consequence that the life of anti-corrosive apparatus is short.

Penetration of water through the coated film is more or less the usual phenomenon observable in every synthetic resin material. A vinylidene fluoride resin film of 55 microns indicates the moisture permeation of 24.4 $g/m^2$ per 24 hr. measured under conditions of 40°C and 90 percent R.H. (in accordance with Japanese Industrial Standard JIS-Z0208). Although this value is fairly small in comparison with that of other synthetic resins, the phenomenon takes place more readily as the temperature of water becomes higher, and the quality of water becomes purer. In order therefore to broaden the applicable scope of the anti-corrosive coating using the vinylidene fluoride resin and to extend the life of the thus coated apparatus, it is inevitably necessary to improve such coating composition in such a way that the volume contraction of the vinylidene fluoride resin and water penetration may be sufficiently restrained.

As a method for restraining the volume contraction of a synthetic resin, there has been generally put into practice the filling of an inorganic substance into the resin. The present inventors also experimented with zinc, iron, stainless steel, alumina, chromium oxide, titanium oxide, calcium carbonate, graphite, etc. as the filler for the vinylidene fluoride resin. However, none of these substances served to sufficiently solve the problem of volume contraction of vinylidene fluoride. Also, with a view to improving the quality of synthetic resin, there have been practiced various modifications or denaturations, such as, for example, the blending of a resin of butadiene and acrylonitrile with a styrol resin to improve its strength, or copoylmerization of vinyl chloride and vinyl acetate to improve the flexibility of the former. Such modifications, however, do not always attain the desired improvement of the synthetic resins, and can only be successful in a limited combination of resins for a particular purpose. The measures in no way suggest improvement of volume contraction and water impermeability of the vinylidene fluoride resin. Besides this, there are also known fillers such as "Viton" (a trademark for a product manufactured by DuPont de Nemour, U.S.A.), obtained from the copolymerization of vinylidene fluoride and hexafluoropropylene, and "Kel-F-Elastomer" (a trademark for a product of Minnesota Mining and Manufacturing Co. Inc., U.S.A.), obtained from the copolymerization of vinylidene fluoride and chloro-trifluoroethylene. These copolymers, however, are different in properties from a vinylidene fluoride resin and have no bearing on improving volume contraction and water impermeability of vinylidene fluoride.

It is therefore an object of the present invention to provide a vinylidene fluoride composition which has the least volume contraction and perfect water impermeability and which is suitable for anti-corrosive coating.

It is another object of the present invention to provide a vinylidene fluoride composition prepared by mixing a vinylidene fluoride resin and a tetrafluoroethylene resin at an appropriate mixing ratio and having the above-described excellent properties.

It is still another object of the present invention to provide a method for anti-corrosive coating by the use of the above-mentioned coating composition.

The foregoing objects and other objects of the present invention will become more apparent from the following detailed description of the invention together with a few preferred examples thereof.

The tetrafluoroethylene resin, in the present invention, has seldom been utilized as an anti-corrosive coating or lining material, in spite of its surpassing corrosion-resistant property, because it has a much higher melting temperature than a vinylidene fluoride resin and, moreover, is not expected to form a perfect coating film without a single pin-hole. On account of this, it has been considered unsuitable to mix tetrafluoroethylene resin with a vinylidene fluoride resin to improve the properties thereof. Even if it is possible to prepare the mixture of tetrafluoroethylene resin and vinylidene fluoride resin there are anticipated technical difficulties in coating an object with such material.

However, the present inventors have found out that, if tetrafluoroethylene resin is mixed with a vinylidene fluoride resin at an appropriate ratio, there is no difficulty whatsoever in obtaining a sufficiently thick coating film which is completely free from the defects when coating with a vinylidene fluoride resin alone, while retaining the characteristics of the vinylidene fluoride resin.

The vinylidene fluoride resin referred to herein designates not only a homopolymer of vinylidene fluoride but also copolymers containing therein more than 95 mol % of vinylidene fluoride and having equal properties to those of the vinylidene fluoride homopolymer. Examples of comonomers used for copolymerization with vinylidene fluoride are tetrafluoroethylene, hexafluoropropylene, monochlorotrifuluoro-ethylene, and vinyl fluoride.

There are two kinds of coating techniques for the vinylidene fluoride coating: the one is "dry coating method" and the other is "wet coating method." The dry coating method involves spreading a powder of the vinylidene fluoride resin on the surface of a preheated base metal, and heating the metal and coating composition to melt the latter, thereby forming a coating film on the base metal. The wet coating method involves preparing a liquid by dispersing and suspending a vinylidene fluoride resin powder in an organic solvent, then applying the suspension liquid to a base metal which is not preheated, and finally heating to melt the coating composition to form the coating film. Either of the two methods is applicable to the present invention.

The coating of the vinylidene fluoride resin composition of the present invention by means of the dry coating method will now be explained hereinbelow. A powder composition consisting of 100 parts by weight of vinylidene fluoride resin and 5–30 parts by weight of tetrafluoroethylene is prepared. In this case, less than 5 parts by weight of tetrafluoroethylene resin content is not capable of improving the defects of vinylidene fluoride resin to a sufficient degree. With more than 30 parts by weight of the content, the coating composition becomes difficult to melt, with the result that no favorable film can be formed. In preparing the coating composition, it may also be possible to add, depending on necessity, a small amount of anti-corrosive pigment, such as chromium oxide.

The vinylidene fluoride resin to be used for the dry coating may be produced by either emulsion-polymerization or suspension-polymerization, provided that the resultant polymer has a particle size distribution of from 100 to 200 meshes (according to Taylor standard) in the main, and the degree of polymerization represented in terms of inherent viscosity $\eta_i$ of dilute solution ranging from 0.6 to 1.4. When $\eta_i$ is smaller than 0.6, the viscosity of the molten composition is too low to obtain a favorable coating film, and the strength of the coating thus obtained is low. When $\eta_i$ is larger than 1.4, the viscosity of the composition at the time of melting is excessively high, which is not suitable for use in the dry coating method. The optimum range of the inherent viscosity is from 0.8 to 1.2. The inherent viscosity used herein to denote the degree of polymerization is indicated in the following equation.

$$\eta_i = 1/C \; ln \; (t/t_o)$$

(where C is a value of 0.4; $ln$ is the natural logarithm; $t_o$ is viscosity of dimethylformamide along measured at 30°C; and $t$ is viscosity of dimethylformamide solution of vinylidene fluoride resin at the concentration of 0.4g/100 cc measured at 30°C)

The particle size of the tetrafluoroethylene resin to be used is preferably a fine powder of less than 325 mesh in diameter. Such tetrafluoroethylene resin is added to the vinylidene fluoride resin powder together with a small amount of pigment, if necessary, placed in a V-shaped blender, and mixed therein for more than 2 hours. As a result, a sufficiently homogenized coating composition can be obtained.

Prior to applying the coating composition according to the present invention by the dry coating method, the base metal to be coated is preheated in a heating furnace at a temperature of from 280°C to 300°C. When the metal has been sufficiently and uniformly heated, it is taken out of the furnace. Then the coating composition is uniformly spread on the required surface of the metal to be coated, and the metal is again placed in the furnace to melt the composition at 280°C to 300°C. Upon formation of the coating film, the coated metal is taken out of the furnace to be cooled in air or other cooling medium, whereby the coating operation is accomplished.

With the coating composition according to the present invention, the resultant coating film is found to be perfectly free from vacuum foams created during the coating or blistering due to the permeation of water during use of the coated articles, as seen in the case of the coated films of vinylidene fluoride resin alone. Thus, the conventional defects in the coated film are substantially eliminated. An example of blistering of the coating due to water premeation is as follows when a metal plate is coated on one surface with a vinylidene fluoride resin coating composition, and then subjected to a boiling water test by setting the coated plate in a device, whereby the metal surface is exposed to the atmosphere and the coated surface is in contact with vapour of boiling water at 100°C, the coated film of vinylidene fluoride resin alone causes blistering due to water within 10 hours from the start of the test, and the adherence of the film to the metal plate is recognized to be remarkably lowered when a knife edge is inserted into the coated surface. In contrast to this, the coating film of the composition according to the present invention does not cause blistering after a lapse of 300 hours and more in the boiling water test, and no decrease in adherence of the coating to the metal plate can be recognized from the knife-edge test. As a matter of fact, the coating which is likely to cause blistering due to water permeation within 10 hours at the boiling water test is estimated to give a very short life of about six months, when it is used in any apparatus which is subjected to heat of more than 60°C. From this, it may be assumed that the coating according to the present invention would keep apparatuses and appliances thus coated as long as 10 years or longer. Furthermore, the coating according to the present invention does not heat-decompose at the time of application to an object to be coated, and it sufficiently maintains various characteristics of vinylidene fluoride resin, such as strength, tenacity, creep-resistance, wear-resistance, etc..

Next, coating of the vinylidene fluoride resin composition according to the present invention by the wet coating method will be explained. 100 parts by weight of vinylidene fluoride resin, 5 to 100 parts by weight of tetrafluoroethylene resin and, depending on necessity, 1 to 100 parts by weight of an anti-corrosive pigment such as chromium oxide are dispersed and suspended in an organic solvent in 250 to 750 parts by weight to prepare a coating composition in liquid or paste form.

The vinylidene fluoride resin to be used for the wet coating may be produced by either emulsion-polymerization or suspension-polymerization, provided that the resultant polymer has a particle size of less than 150 meshes, and preferably less than 200 meshes, and an inherent viscosity $\eta_i$ of from 0.6 to 3.0.

The tetrafluoroethylene resin to be used is preferably of fine powder of less than 325 meshes in diameter.

The organic solvent for this purpose is selected from those of ketone and ester types. It is particularly effective to use a mixture of a ketone or ester type organic solvent having a boiling point of 100° to 200°C (low boiling point solvent) and capable of dissolving vinylidene fluoride resin at a temperature of from 50°C to 150°C, and a ketone or ester type organic solvent having a boiling point of 150° to 350°C (high boiling point solvent) and capable of dissolving vinylidene fluoride at a temperature of from 100°C to 170°C at a mixing ratio of from 10:90 to 50:50. However, the invention is not limited to this mixture solvent alone. Examples of the low boiling point solvent are γ-butyrolactone, diacetone alcohol, etc.. The high boiling point solvents are dimethyl phthalate, diethyl phthalate, and so forth.

The reasons for the higher upper limit of the inherent viscosity $\eta_i$ of vinylidene fluoride resin and the larger amount of tetrafluoroethylene resin to be added in the wet coating than in the dry coating are that, in the wet coating, there is used an organic solvent which dissolves vinylidene fluoride resin at a high temperature treatment, and, in the process of forming a coating film by melting the composition, as there still remains some amount of the solvent in the coating composition, the viscosity of the molten composition does not increase as much, even if the inherent viscosity $\eta i$ of the vinylidene fluoride resin is high. Moreover, a uniform coating can be obtained with more than 30 parts by weight of tetrafluoroethylene resin, although, when the content of tetrafluoroethylene resin exceeds 100 parts by weight, no uniform coating can be practically obtained.

The only difference in wet coating from dry coating is that a liquid or paste composition is applied to the required surface of base metal which has not been subjected to preheating.

In order to enable skilled persons in the art to reduce the invention into practice, the following examples are presented, it being understood, however, that the invention is not limited to these examples alone.

EXAMPLE 1

The following ingredients were placed in a V-shaped blender, and mixed for 5 hours to prepare a sufficiently homogenized powder composition for dry coating.

|  | part by weight |
|---|---|
| Vinylidene fluoride * resin | 100 |
| Tetrafluoroethylene ** resin | 15 |
| Chromium oxide powder | 1 |

\* Homopolymer of vinylidene fluoride obtained by suspension-polymerization and having inherent viscosity $\eta_i$ of 0.93
\*\* Particle size of 325-mesh under The above coating composition was spread to a thickness of 1 mm on the inner surface of a 2-inch diaphragm valve of cast iron which had previously been sand-blasted and preheated to 280°C, thereafter the valve was again placed in a furnace at a temperature of 280°C. After 30 minutes, the coating in molten state was formed and the valve was taken out of the furnace to cool the coated film to solidity. In spite of the fact that the inner surface of the valve forms complicated curves surfaces, no vacuum foams were found to have been created in the resultant coating.

As a comparison, coating was made by using the above-mentioned composition, from which tetrafluoroethylene resin was removed, under the same coating conditions as above. Countless numbers of vacuum foams were created at concaved portions of a small radius of curvature in the inner surface of the valve when cooled.

EXAMPLE 2

Two discs of iron having 150 mm in diameter and 3 mm in thickness were prepared. Both discs were sand-blasted on one surface to remove rust, and then preheated to 280°C. One of the discs was applied on its sand-blasted surface with the powder composition according to this invention as used in Example 1 above to a thickness of 1 mm. The other disc was coated with vinylidene fluoride powder alone in the same manner as in Example 1.

The two discs were then subjected to the boiling water test by setting them in a device, whereby the uncoated surface of the iron disc is exposed to the atmosphere and the coated surface is made to contact water vapor at 100°C. It was verified that the coating with vinylidene fluoride resin alone caused swelling after 5 hours, and adherence of the coated film to the base metal decreased according to the knife edge test, whereas the coating according to the present invention did not cause blistering even after 300 hours of boiling and no decrease in the adherence could be observed.

EXAMPLE 3

The following ingredients were charged in a ball mill, and mixed for 16 hours at a normal temperature to prepare homogeneous liquid composition for wet coating.

|  | part by weight |
|---|---|
| Vinylidene fluoride resin * | 100 |
| Tetrafluoroethylene resin ** | 40 |
| Chromium oxide powder | 5 |
| Diacetone alcohol | 70 |
| Dimethylphthalate | 250 |

\* Homopolymer of vinylidene fluoride obtained by emulsion-polymerization, having inherent viscosity $\eta_i$ of 1.6 and particle size of 325-mesh under
\*\* Particle size of 325-mesh under The iron disc used in Example 2 was cooled on its one surface with the above liquid composition by spraying it to a thickness of 0.2 mm, and then placed in a heating furnace at a temperature of 270°C. After 30 minutes of heating, as the coated composition was found in a molten state, the disc was taken out of the furnace and was left to cool the molten composition to solidify. Thereafter, the operations of spray-coating, heating-to-melt, and cooling-to-solidify were repeated, and the coating of 0.5 mm thick was finally obtained.

The thus coated iron disc was subjected to the boiling water test as conducted in the above Example 2. The result is that, even after 300 hours, no blistering occurred and no decrease in the adherence of the film to the base metal could be recognized from the knife-edge test. In contrast thereto, the coating obtained from the above composition, excepting tetrafluoroethylene resin under exactly the same coating conditions caused blistering after 8 hours of boiling and reduced its adherence to the base metal.

What we claim is:

1. A method for producing an anti-corrosive coating which comprises:
   a. preparing a coating composition by uniformly dispersing and suspending 100 parts by weight of a vinylidene fluoride homopolymer having a particle size range of from 100 to 200 meshes and an inherent viscosity of from 0.6 to 3.0 and 5 to 100 parts by weight of a tetrafluoroethylene resin having a particle size of 325 meshes and below in a mixture of a low boiling point solvent capable of dissolving the vinylidene fluoride resin at a temperature of from 50° to 150°C and a high boiling point solvent capable of dissolving the vinylidene fluoride resin at a temperature from 100° to 170°C at a mixing ratio of from 10 : 90 to 50 : 50;
   b. applying said coating composition onto at least one surface of the object to be coated;
   c. heating the entire object to melt the applied coating composition thereonto; and
   d. subsequently cooling the coated layer to solidify said coated layer.

2. The method according to claim 1, wherein said low boiling point solvent possesses a boiling point range of from 100° to 200°C, and is selected from the group consisting of γ-butyrolactone and diacetone alcohol.

3. The method according to claim 1, wherein said high boiling point solvent possesses a boiling point range of from 150° to 350°C, and is selected from the group consisting of dimethyl phthalate and diethyl phthalate.

4. The method according to claim 1, wherein the solvents are present in an amount of 250 to 750 parts by weight.

* * * * *